United States Patent [19]

Cooper et al.

[11] 4,172,929

[45] Oct. 30, 1979

[54] PLATED POLYPHENYLENE ETHER RESIN COMPOSITIONS CONTAINING EPDM RUBBER-MODIFIED ALKENYL AROMATIC RESINS AND HYDROGENATED ELASTOMERIC BLOCK COPOLYMERS

[75] Inventors: Glenn D. Cooper, Delmar; William R. Haaf, Voorheesville; Arthur Katchman, Delmar, all of N.Y.

[73] Assignee: General Electric Company, Pittsfield, Mass.

[21] Appl. No.: 855,247

[22] Filed: Nov. 28, 1977

[51] Int. Cl.$^2$ .................. C08J 9/00; C08K 7/14; C08L 51/00; C08L 53/00
[52] U.S. Cl. .................. 521/139; 260/45.7 R; 260/45.7 P; 260/45.75 B; 260/45.9 NP; 428/409; 521/62; 521/140; 525/96
[58] Field of Search .................. 428/409, 462; 260/2.5 M, 876 R, 876 B, 42.18, 45.7 R, 45.7 P, 45.75 B, 45.9 NP; 521/62, 139, 140

[56] References Cited

U.S. PATENT DOCUMENTS

| | | | |
|---|---|---|---|
| 3,299,174 | 1/1967 | Kuhre et al. | 260/876 B |
| 3,333,024 | 7/1967 | Haefele et al. | 260/880 |
| 3,658,945 | 4/1972 | Nakashio | 260/376 R |
| 3,669,714 | 6/1972 | Wiley | 428/462 |
| 3,943,191 | 3/1976 | Cooper | 260/876 R |
| 3,960,808 | 6/1976 | Katchman | 260/876 B |
| 3,981,841 | 9/1976 | Abolins et al. | 260/876 R |

OTHER PUBLICATIONS

Heyman, et al., "Electroplating Clusters in Theory and Practice", *Angew Chem.*, Internat Edit., vol. 9, No. 6, pp. 425-433, 1970.

*Primary Examiner*—J. Ziegler
*Attorney, Agent, or Firm*—Morgan, Finnegan, Pine, Foley & Lee

[57] ABSTRACT

Novel plated compositions are disclosed which include a polyphenylene ether resin, a small-particle EPDM rubber-modified alkenyl aromatic resin, and a hydrogenated A-B-A block polymer. Also included within the scope of this invention are reinforced and flame-retardant compositions of said polyphenylene ether resin, said alkenyl aromatic resin modified with an EPDM rubber, and said hydrogenated elastomeric block copolymer.

28 Claims, No Drawings

PLATED POLYPHENYLENE ETHER RESIN COMPOSITIONS CONTAINING EPDM RUBBER-MODIFIED ALKENYL AROMATIC RESINS AND HYDROGENATED ELASTOMERIC BLOCK COPOLYMERS

This invention relates to plated compositions of a polyphenylene ether resin, an alkenyl aromatic resin modified with an EPDM rubber, and a hydrogenated elastomeric block copolymer. Reinforced and flame-retardant compositions are also provided.

BACKGROUND OF THE INVENTION

The polyphenylene ether resins are a family of engineering thermoplastics that are well known to the polymer art. These polymers may be made by a variety of catalytic and non-catalytic processes from the corresponding phenols or reactive derivatives thereof. By way of illustration, certain of the polyphenylene ethers are disclosed in Hay, U.S. Pat. Nos. 3,306,874 and 3,306,875, and in Stamatoff, U.S. Pat. Nos. 3,257,357 and 3,256,358. In the Hay patents, the polyphenylene ethers are prepared by an oxidative coupling reaction comprising passing any oxygen-containing gas through a reaction solution of a phenol and a metal-amine complex catalyst. Other disclosures relating to processes for preparing polyphenylene ethers reins, including graft copolymers of polyphenylene ethers with styrene type compounds, are found in Fox, U.S. Pat. No. 3,356,761; Sumitomo, U.K. Pat. No. 1,291,609; Bussink, et al., U.S. Pat. No. 3,337,892; Blanchard, et al., U.S. Pat. No. 3,219,626; Laakso, et al., U.S. Pat. No. 3,342,892; Borman, U.S. Pat. No. 3,344,116; Hori, et al., U.S. Pat. No. 3,384,619; Faurote, et al. U.S. Pat. No. 3,440,217; and Cooper, et al., U.S. Pat. No. 3,661,848, U.S. Pat. No. 3,733,299 U.S. Pat. No. 3,838,102, and U.S. Pat. No. 3,988,297. Dislosures relating to metal based catalysts which do not include amines, are known from patents such as Wieden, et al., U.S. Pat. No. 3,442,885 (copper-amidines); Nakashio, et al., U.S. Pat. No. 3,573,257 (metal-alcholate or -phenolate); Kobyashi, et al., U.S. Pat. No. 3,445,880 (cobalt cheltates); and the like. In the Stamatoff patent, the polyphenylene ethers are produced by reacting the corresponding phenolate ion with an initiator, such as peroxy acid salt, and acid peroxide, a hypohalite, and the like, in the presence of a complexing agent. Disclosures relating to non-catalytic processes, such as oxidation with lead oxide, silver oxide, etc., are described in Price, et al., U.S. Pat. No. 3,383,212. Cizek, U.S. Pat. No. 3,383,435 discloses polyphenylene ether-styrene resin compositions. All of the above-mentioned disclosures are incorporated by reference.

In the prior art, rubber-modified styrene resins have been admixed with polyphenylene ether resins to form compositions that have modified properties. The Cizek patent, U.S. Pat. No. 3,383,435, discloses rubber-modified styrene resin-polyphenylene ether resin compositions wherein the rubber component is of the unsaturated type such as polymers and copolymers of butadiene. The physical properties of these compositions are such that it appears that many of the properties of the styrene resins have been upgraded, while the moldability of the polyphenylene ethers are improved.

Nakashio, et al. U.S. Pat. No. 3,658,945 discloses that from 0.5 to 15% by weight of an EPDM-modified styrene resin may be used to upgrade the impact strength of polyphenylene ether resins. In Cooper, et al., U.S. Pat. No. 3,943,191 it is disclosed that when the highly unsaturated rubber used in compositions of the type disclosed by Cizek, it replaced with EPDM rubber that has a low degree of residual unsaturation, the thermal oxidative stability and color stability are improved. The EPDM rubber in the Cooper, et al. compositions is comprised substantially of particles in the range of 3-8 microns. The disclosures of the Nakashio, et al. and Cooper, et al. patents are incorporated herein by reference.

The impact strength of the Cooper, et al. compositions is superior to that of a polyphenylene ether resin alone or that of similar compositions comprised of unmodified polystyrene; however, the impact strength of the Cooper, et al. compositions is inferior to that of similar compositions comprised of polystyrene modified with polybutadiene rubber, such as a composition known as FG-834, available from Foster-Grant Co.

As is disclosed in Abolins, et al., U.S. Pat. No. 3,981,841, the impact strength of the Cooper, et al. compositions can be improved by incorporating therein impact modifiers such as an emulsion-grafted EPDM polystyrene copolymer. In copending U.S. patent application Ser. No. 787,253, filed Apr. 13, 1977, incorporated herein by reference, it is disclosed that a composition of a polyphenylene ether resin and an alkenyl aromatic resin modified with an EPDM rubber comprised of particles having a median diameter less than about two microns, preferably about 0.5 to 1.5 microns, is a very useful thermoplastic molding material having good thermal oxidative stability and good impact strength.

In copending U.S. application Ser. No. 855,250 filed Nov. 28, 1977, it is disclosed that a composition of a polyphenylene ether resin, an alkenyl aromatic resin modified with a small-particle EPDM rubber, and a hydrogenated elastomeric block copolymer is a very useful thermoplastic molding material having good thermal oxidative stability and surprisingly high impact resistance. The above application is incorporated herein by reference.

Many plastic applications require a metal-plated surface. The metal coating may be applied to provide decoration, to provide resistance to ultraviolet radiation, to provide electric conductivity, or for one of many other purposes. Plastics containing unsaturated rubber are plated by first exposing them to an etching solution, and then the surface is "activated" by deposition of a small amount of a metal, usually silver, platinum, palladium or gold. The metal thus deposited serves as a catalytic agent in the next step, the electroless plating of the surface with a continuous thin film of nickel or copper. Plating is completed by conventional electroplating methods to produce the desired plate thickness and final surface coat.

Etching is the key to successful plating of plastics. The etching solution, usually chromic acid or a solution of chromic acid in sulfuric acid, attacks the double bonds in the rubber particles, dissolving out the rubber particles and producing a surface containing many tiny undercut "holes". The partially oxidized inner surface of the holes provides a preferential site for deposition of the activating metal. This assures complete filling of the undercut holes with metal and provides the mechanical lock of the metal to the plastic which is necessary for adequate adhesion.

It has now been found that although the double bonds believed necessary for etching and adhesion are absent, compositions based on polyphenylene ether resins and saturated rubber-modified alkenyl aromatic resins can be successfully plated under standard plating conditions. The plated materials have the improved stability characteristic of polyphenylene ether resin compositions containing a saturated rubber and have surface appearance and plate adhersion, i.e., peel strength, characteristics as good as those of plated polyphenylene ether resin compositions materials containing polybutadiene or other unsaturated rubbers.

It is, therefore, a primary object of this invention to provide plated compositions that are based on polyphenylene ether resins, modified alkenyl aromatic resins, and hydrogenated elastomeric block copolymers.

Another object of this invention is to provide plated compositions and molded articles that are based on a polyphenylene ether resin and a small-particle EPDM-modified alkenyl aromatic resin and that have improved thermal oxidative stability.

Still another object of this invention is to provide plated compositions and molded articles that are based on a polyphenylene ether resin, a small-particle EPDM-modified alkenyl aromatic resin, a hydrogenated elastomeric block copolymer and that have improved strength.

It is also an object of this invention to provide the above-described, plated compositions in reinforced and/or flame-retardant embodiments.

DESCRIPTION OF THE INVENTION

The above-mentioned advantages and objects and others will be readily apparent to those skilled in the art by the following compositions.

This invention is directed to substrates adapted for the electroless deposition of an adherent coating of metal comprising a molded thermoplastic composition comprising:

(a) from 10 to 65% by weight of a polyphenylene ether resin;

(b) from 20 to 80% by weight of an alkenyl aromatic resin that is modified with a small-particle EPDM rubber, that is, a rubbery interpolymer comprised of particles having a median diameter less than about two microns and comprising a mixture of mono-olefins and polyene; and (c) from 1 to 25% by weight of a selectively hydrogenated elastomeric block copolymer of the A-B-A type, wherein the polymerized vinyl aromatic hydrocarbon and center block B is a polymerized conjugated diene, the surfaces of said substrates having been rendered microporous by treatment with an etching solution.

The preferred polyphenylene ethers are of the formula

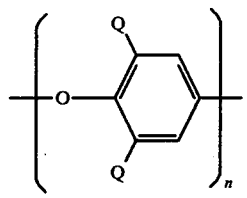

I wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Examples of polyphenylene ethers corresponding to the above formula can be found in the above referenced patents of Hay and Stamatoff. Especially preferred is poly(2,6-dimethyl-1,4-phenylene) ether.

The alkenyl aromatic resin should have at least 25% of its units derived from an alkenyl aromatic monomer of the formula

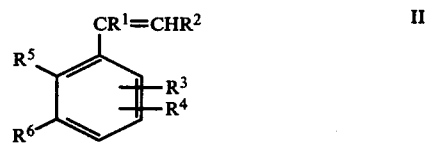

II wherein $R^1$ and $R^2$ are selected from the group consisting of hydrogen and lower alkyl or alkenyl groups of from 1 to 6 carbon atoms; $R^3$ and $R^4$ are selected from the group consisting of chloro, bromo, hydrogen, and lower alkyl groups of from 1 to 6 carbon atoms; and $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group.

Specific examples of alkenyl aromatic monomers include styrene, bromostyrene, chlorostyrene, α-methylstyrene, vinylxylene, divinylbenzene, vinyl naphthalene, and vinyl-toluene.

The alkenyl aromatic monomer may be copolymerized with materials such as those having the general formula

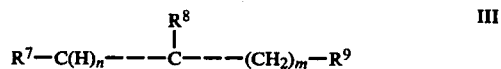

III wherein the dotted lines each represent a single or a double carbon to carbon bond; $R^7$ and $R^8$ taken together represent a

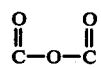

linkage; $R^9$ is selected from the group consisting of hydrogen, vinyl, alkyl of from 1 to 12 carbon atoms; alkenyl of from 1 to 12 carbon atoms, alkylcarboxylic acid of from 1 to 12 carbon atoms, and alkenylcarboxylic acid of from 1 to 12 carbon atoms; n is 1 or 2, depending on the position of the carbon-carbon double bond; and m is an integer of from 0 to about 10. Examples include maleic anhydride, citraconic anhydride, itaconic anhydride, aconitic anhydride, and the like.

The alkenyl aromatic resins include, by way of example, homopolymers such as homopolystyrene and monochloropolysyrene, and styrene-containing copolymers, such as styrene-chlorostyrene copolymers, styrene-bromostyrene copolymers, the styrene acrylonitrile-α-alkyl styrene copolymers, styrene-acrylonitrile copolymers, styrene butadiene copolymers, styrene acrylonitrile butadiene copolymers, poly-α-methylstyrene, copolymers of ethylvinylbenzene, divinylbenzene, and styrene maleic anhydride copolymers, and block copolymers of styrene butadiene and styrene-butadiene styrene.

The styrene-maleic anhydride copolymers are described in U.S. Pat. Nos. 2,971,939; 3,336,267; and 2,769,804, all of which are incorporated herein by reference.

The useful EPDM rubbers include those prepared from ethylene, an alpha-olefin, and a polyene. Preferred types comprise 10–90 mole percent of ethylene, 10–90 mole percent of an alpha-olefin containing 3–16 carbon atoms, and 0.1–12 mole percent of a polyene that is a non-conjugated cyclic or open-chain diene having 5–20 carbon atoms. Especially preferred are those alpha-olefins having 3–10 carbon atoms and non-conjugated cyclic or open-chain dienes having 5–10 carbon atoms.

Useful EPDM rubbers also include the ethylene-propylene-ethylidene norbornene terpolymer and those described in Ritchie, *Vinyl and Allied Polymer*, Vol. 1, pp. 121 (1968), which is incorporated herein by reference. Preferred EPDM rubbery interpolymers are those comprised of ethylene, propylene, and 5-ethylidene-2-norbornene; of ethylene, propylene, and 1,4-hexadiene; and of ethylene, propylene, and dicyclopentadiene. Preferred modified alkenyl aromatic resins will include from about 4 to about 25% by weight of rubbery interpolymer.

The alkenyl aromatic resin modified with a small-particle EPDM rubber may be prepared by dissolving the rubbery interpolymer in the alkenyl aromatic monomer and polymerizing the mixture, preferably in the presence of a free-radical initiator, until 90–100% by weight of the alkenyl aromatic monomer has reacted to form said small-particle EPDM-modified alkenyl aromatic resin.

In the selectively hydrogenated elastomeric block copolymers of the A-B-A type, the terminal blocks A represent polymerized monomers of Formula II above. Center block B represents a polymerized conjugated diene of at least four carbon atoms, preferably selected from the group of 1,3-butadiene, 2-methy-1,3-butadiene, 2,3-dimethyl-1,3-butadiene, and 1,3-pentadiene. The preferred A-B-A block copolymers are the styrene-butadiene-styrene block copolymers having 60 to 90 parts by weight of styrene to 100 parts by weight of butadiene.

The elastomeric A-B-A block copolymers useful in this invention are selectively hydrogenated in that only the center block B is hydrogenated. For example, in such styrene-butadiene-styrene block copolymers only the center block, butadiene, and not the terminal blocks, styrene, have been hydrogenated.

The ratios of the polymerized monomers can vary broadly, so long as the molecular weight of the center block is greater than the combined molecular weights of terminal blocks. Preferably, within this limitation, the molecular weight of each hydrogenated terminal block will range from about 4,000 to about 115,000 and that of the center block will range from about 20,000 to about 450,000.

Unhydrogenated block copolymers can be prepared by an organometallic initiation process using, for example, sodium or lithium metal or an organic derivatives thereof. The diene monomers can be polymerized with a monofunctional or difunctional initiator, as is described in detail in "Polymer Chemistry of Synthetic Elastomers", edited by Kennedy, et al., Interscience Publishers, Vol. 23, Part II (1969), pp. 553–559, incorporated herein by reference.

Other methods of preparation are described in Zelinski, U.S. Pat. No. 3,251,905 and Holden, et al., U.S. Pat. No. 3,231,635, the disclosures of which are incorporated herein by reference.

Selective hydrogenation may be conducted using a variety of hydrogenation catalysts, e.g., nickel, Raney nickel, copper chromate, molybdenum sulfide, finely divided platinum, etc., on a carrier. The hydrogenation can be carried out at any desired temperature or pressure, from atmospheric to about 3,000 p.s.i.g., the usual range being between about 100 and 1,000 p.s.i.g., at temperatures of from about 75° to 600° F., for a period of time ranging from about 0.1 to 24 hours, preferably about 0.2 to 8 hours. The preparation of hydrogenated block copolymers is described in detail in Jones, U.S. Pat. No. 3,431,323, the disclosure of which is incorporated herein by reference.

Preferably the average unsaturation of center block B in the A-B-A type block copolymers is reduced to less than about 20% of its original value.

The polyphenylene ether resin compositions described above can be plated by any of several methods well-known to those skilled in the art. See, for example, Heymann, et al., Angew. Chem. International Edition, 9, 428 (1970), the disclosure of which is incorporated herein by reference.

The compositions of the invention can also include other ingredients, such as flame retardants, extenders, processing aids, pigments, stabilizers, fillers such as mineral fillers and glass flakes and fibers, and the like. In particular, reinforcing fillers, in amounts sufficient to impart reinforcement, can be used, e.g., aluminum, iron or nickel, and the like, and non-metals, e.g., carbon filaments, silicates, such as acicular calcium silicate, asbestos, titanium dioxide, potassium titanate and titanate whiskers, glass flakes and fibers, and the like. It is to be understood that, unless the filler adds to the strength and stiffness of the composition, it is only a filler and not a reinforcing filler as contemplated herein. In particular, the reinforcing fillers increase the flexural strength, the flexural modulus, and the tensile strength.

Although it is only necessary to have at least a reinforcing amount of the reinforcement present, in general, the combination of components (a), (b), and (c) will comprise from about 10 to about 90 parts by weight and the filler will comprise from about 10 to about 90 parts by weight of the total composition.

In particular, the preferred reinforcing fillers are of glass, and it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, by flame blowing, or by mechanical pulling. The preferred filaments for plastics reinforcement are made by mechanical pulling. The filament diameters range from about 0.000112 to 0.00075 inch, but this is not critical to the present invention.

In general, the best properties will be obtained if the sized filamentous glass reinforcement comprises from about 1 to 80% by weight based on the combined weight of glass and polymers and preferably from about 10 to about 50% by weight. Especially preferably the glass will comprise from about 10 to about 40% by weight based on the combined weight of glass and resin. Generally, for direct molding use, up to about 60% of glass can be present. However, it is useful also to prepare the compositions containing substantially greater quantities, e.g., up to 70–80% by weight of glass. These concentrates can then be custom blended with resin compositions that are not glass reinforced to provide any desired glass content of a lower value.

The length of the glass filaments and whether or not they are bundled into fibers and the fibers bundled in turn to yarns, ropes or rovings, or woven into mats, and the like, are also not critical to the invention. However, in preparing the present compositions it is convenient to use the filamentous glass in the form of chopped strands of from about ⅛" to about 1" long, preferably less than ¼" long. In articles molded from the compositions, on the other hand, even shorter lengths will be encountered because, during compounding, considerable fragmentation will occur. This is desirable, however, because the best properties are exhibited by thermoplastics injection molded articles in which the filament lengths lie between about 0.005 to 0.125 inch.

Because it has been found that certain commonly used flammable sizings on the glass, e.g., dextrinized starch or synthetic polymers, contribute flammability often in greater proportion than expected from the amount present, it is preferred to use lightly sized or unsized glass reinforcements in those compositions of the present invention which are flame-retardant. Sizings, if present, can readily be removed by heat cleaning or other techniques well known to those skilled in the art.

It is also a feature of this invention to provide flame-retardant thermoplastics compositions, as defined above, by modifying the composition to include a flame-retardant additive in a minor proportion but in an amount at least sufficient to render the composition self-extinguishing. Such flame-retardant compositions include a halogenated organic compound, a halogenated organic compound in admixture with an antimony compound, elemental phosphorus, a phosphorus compound, compounds containing phosphorus-nitrogen bonds, or a mixture of two or more of the foregoing.

When used herein, the terms "self-extinguishing" and "non-dripping" are used to describe compositions which meet the standards of Underwriters' Laboratories Bulletin No. 94. Another recognized procedure to determine flame resistance of resinous compositions is the Oxygen Index Test or LOI (Limiting Oxygen Index). This test is a measure of a product's combustibility based on the oxygen content of the combustion atmosphere. Appropriate specimens are placed in a combustion chimney, and the oxygen is reduced stepwise until the material no longer supports a flame. The LOI is defined as the percent oxygen times 100 divided by the sum of the percentages of nitrogen and oxygen in the gas used to burn the material under test. Further details of the Oxygen Index Test are found in ASTM test method D-2863. The compositions of this invention which contain flame-retardant additives in the specified amounts have a substantially higher oxygen index than the controls.

The flame-retardant additives useful in this invention comprise a family of chemical compounds well known to those skilled in the art. Generally speaking, the more important of these compounds contain chemical elements employed for their ability to impart flame resistance, e.g., bromine, chlorine, antimony, phosphorus, and nitrogen. It is preferred that the flame-retardant additive comprise a halogenated organic compound (brominated or chlorinated); a halogen-containing organic compound in admixture with antimony oxide; elemental phosphorus or a phosphorus compound; a halogen-containing compound in admixture with a phosphorus compound or compounds containing phosphorus-nitrogen bonds; or a mixture of two or more of the foregoing.

The amount of flame-retardant additive used is not critical to the invention, so long as it is present in a minor proportion based on the polyphenylene ether-modified alkenyl aromatic polymer composition—major proportions will detract from physical properties—but at least sufficient to render the composition self-extinguishing. Those skilled in the art are well aware that the amount will vary with the nature of the polymers in the composition and with the efficiency of the additive. In general, however, the amount of additive will be from about 0.5 to 50 parts by weight per hundred parts of components (a), (b), and (c). A preferred range will be from about 1 to 25 parts, and an especially preferred range will be from 3 to 15 parts of additive per hundred parts of (a), (b), and (c). Smaller amounts of compounds highly concentrated in the elements responsible for flame retardance will be sufficient, e.g., elemental red phosphorus will be preferred at about 0.5 to 10 parts by weight per hundred parts. of (a), (b), and (c), while phosphorus in the form of triphenyl phosphate will be used at about 3 to 25 parts of phosphate per hundred parts of (a), (b), and (c), and so forth. Halogenated aromatics will be used at about 2 to 20 parts and synergists, e.g., antimony oxide, will be used at about 1 to 10 parts by weight per hundred parts of components (a), (b), and (c).

Among the useful halogen-containing compounds are those of the formula

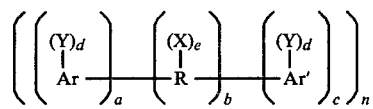

IV wherein n is 1 to 10 and R is an alkylene, alkylidene, or cycloaliphatic linkage, e.g., methylene, ethylene, propylene, isopropylene, isopropylidene, butylene, isobutylene, amylene, cyclohexylene, cyclopentylidene, and the like; or a linkage selected from the group consisting of ether; carbonyl; amine; a sulfur-containing linkage, e.g., sulfide, sulfoxide, or sulfone; carbonate; a phosphorus-containing linkage; and the like. R can also consist of two or more alkylene or alkylidene linkages connected by such groups as aromatic, amino, ether, ester, carbonyl, sulfide, sulfoxide, sulfone, a phosphorus-containing linkage, and the like. R can be dihydric phenol, e.g., bisphenol-A, carbonate linkage. Other groups which are represented by R will occur to those skilled in the art. Compounds of this type are disclosed in U.S. Pat. No. 3,647,747 and U.S. Pat. No. 3,334,154, both of which are incorporated herein by reference.

Ar and Ar' and mono- or polycarbocyclic aromatic groups such as phenyl, biphenyl, terphenyl, naphthyl, and the like. Ar and Ar' may be the same or different.

X is a monovalent hydrocarbon group exemplified by the following: alkyl groups, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used, they may be alike or different.

Y is a substituent selected from the group consisting of organic, inorganic, and organometallic radicals. The substituents represented by Y include (1) halogen, e.g., chlorine, bromine, iodine, or fluorine, (2) ether groups of the general formula OE, wherein E is a monovalent hydrocarbon radical similar to X, (3) monovalent hydrocarbon groups of the type represented by R, and (4) other substituents, e.g., nitro, cyano, etc., said substituents being essentially inert provided there be at least one and preferably two halogen atoms per aryl, e.g., phenyl nucleus.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0, and when b is 0, either a or c, but not both, may be 0. Where b is 0, the aromatic groups are joined by a direct carbon-carbon bond.

The hydroxyl and Y substituents on the aromatic groups, Ar and Ar', can be varied in the ortho, meta, or para positions on the aromatic rings, and the groups can be in any possible geometric relationship with respect to one another.

Included within the scope of the above formula are di-aromatics of which the following are representative:
2,2-bis-(3,5-dichlorophenyl)propane
bis-(2-chlorophenyl)methane
bis-(2,6-dibromophenyl)methane
1,1-bis-(4-iodophenyl)ethane
1,2-bis-(2,6-dichlorophenyl)ethane
1,1-bis-(2-chloro-4-iodophenyl)ethane
1,1-bis-(2-chloro-4-methylphenyl)ethane
1,1-bis-(3,5-dichlorophenyl)ethane
2,2-bis-(3-phenyl-4-bromophenyl)ethane
2,3-bis-(4,6-dichloronaphthyl)propane
2,2-bis-(2,6-dichlorophenyl)pentane
2,2-bis-(3,5-dichromophenyl)hexane
bis-(4-chlorophenyl)phenylmethane
bis-(3,5-dichlorophenyl)cyclohexylmethane
bis-(3-nitro-4-bromophenyl)methane
bis-(4-hydroxy-2,6-dichloro-3-methoxyphenyl)methane
2,2-bis-(3,5-dichloro-4-hydroxyphenyl)propane
2,2-bis-(3-bromo-4-hydroxyphenyl)propane.

The preparation of these and other applicable biphenyls are known in the art. In the above examples sulfide, sulfoxy, and the like may be substituted in place of the divalent aliphatic group.

Included within the above structural formula are substituted benzenes exemplified by tetrabromobenzene, hexachlorobenzene, hexabromobenzene, and biphenyls such as 2,2'-dichlorobiphenyl, 2,4'-dibromobiphenyl, 2,4'-dichlorobiphenyl, hexabromobiphenyl, octabromobiphenyl, decabromobiphenyl, and halogenated diphenyl ethers containing from 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl, or a compound comprising two phenyl radicals separated by a divalent alkylene group and having at least two chlorine or bromine atoms per phenyl nucleus, or mixtures of at least two of the foregoing.

Especially preferred are hexabromobenzene and chlorinated biphenyls or terphenyls, alone, or mixed with antimony oxide.

In general, the preferred phosphorus compounds are selected from the group of elemental phosphorus and organic phosphonic acids, phosphonates, phosphine oxides, phosphines, phosphites, and phosphates. Illustrative is triphenyl phosphine oxide. These can be used alone or mixed with hexabromobenzene or a chlorinated biphenyl and, optionally, antimony oxide.

Typical of the preferred phosphorus compounds to be employed in this invention would be those having the general formula

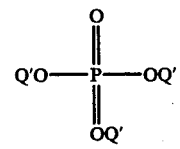

V and nitrogen analogs thereof where each Q' represents the same or different radicals including hydrocarbon radicals such as alkyl, cycloakyl, aryl, alkyl substituted aryl, and aryl substituted alkyl; halogen; hydrogen; and combinations thereof provided that at least one said Q' is aryl. Typical examples of suitable phosphates include phenylbisdodecyl phosphate, phenylbisneopentyl phosphate, phenylethylene hydrogen phosphate, phenylbis-(3,5,5'-trimethylhexyl phosphate), ethyl-diphenyl phosphate, bis(2-ethylhexyl) p-tolyphosphate, tritolyl phosphate, bis-(2-ethylhexyl)-phenyl phosphate, tri(nonylphenyl) phosphate, phenylmethyl hydrogen phosphate, di(dodecyl) p-tolyl phosphate, tricresyl phosphate, triphenyl phosphate, halogenated triphenyl phosphate, dibutylphenyl phosphate, 2-chloroethyldiphenyl phosphate, p-tolyl bis(2,5,5-trimethylhexyl) phosphate, 2-ethylhexyldiphenyl phosphate, diphenyl hydrogen phosphate, and the like. The preferred phosphates are those where each Q' is aryl. The most preferred phosphate is triphenyl phosphate. It is also preferred to use triphenyl phosphate in combination with hexabromobenzene and, optionally, antimony oxide. Especially preferred is a composition comprised of mixed triaryl phosphates with one or more isopropyl groups on some or all of the aryl rings, such as Kronitex 50 supplied by Food Machinery Corporation.

Also suitable as flame-retardant additives for this invention are compounds containing phosphorus-nitrogen bonds, such as phosphonitrilic chloride, phosphorus ester amides, phosphoric acid amides or phosphonic acid amides. These flame-retardant additives are commercially available.

The compositions of the invention may be formed by conventional techniques, that is, by first dry mixing the components to form a premix, and then passing the premix through an extruder at an elevated temperature, e.g., 425° to 640° F. By way of illustration, glass roving (a bundle of strands of filaments) is chopped into small pieces, e.g., ⅛" to 1" in length, and preferably less than ¼" in length and put into an extrusion compounds with (a) the polyphenylene ether resin, (b) the alkenyl aromatic resin that is modified with a small-particle rubbery interpolymer of a mixture of mono-olefins and a polyene, (c) the hydrogenated elastomeric block copolymer, and (d) the flame-retardant additive(s), to produce molding pellets. The fibers are shortened in the predispersed in the process, coming out at less than 1/16" long. In another procedure, glass filaments are ground or milled to short lengths, are mixed with polyphenylene ether resin, the modified alkenyl aromatic polymer and, optionally, flame-retardant additive, by dry blending, and then are either fluxed on a mill and ground, or are extruded and chopped.

In addition, compounding should be carried out to insure that the residence time in the machine is short; that the temperature is carefully controlled; that the frictional heat is utilized; and that an intimate mixture between the resins and the additives is obtained.

The extruded molding pellets are molded in a molding machine, and then the molded articles are plated according to known techniques.

DESCRIPTION OF THE PREFERRED EMBODIMENTS

The following example is set forth as further illustration of the invention and are not to be construed as limiting the invention thereto.

EXAMPLE I

Twenty-five parts of PPO, 3 parts of titanium dioxide, 1.5 parts of polyethylene, 0.05 parts of carbon black, 0.5 parts of decyldiphenyl phosphite, and 75 parts of polystyrene containing 10% of EPDM rubber having an average particle diameter of 1.5 microns, were mixed and extruded in a 28 mm twin-screw extruder. The extruded pellets were molded into ⅛"×2½"×3¼" plaques in a Newbury screw injection molding machine. A second composition was prepared in the same way, using polystyrene containing 15% EPDM rubber with an average particle diameter of 1.1 microns.

Another composition was prepared in the same way, from 25 parts of PPO, 3 parts of titanium dioxide, 1.5 parts of polyethylene, 0.05 parts of carbon black, 0.5 parts decyldiphenyl phosphite, 65 parts of the polystyrene containing 10% EPDM rubber, and 10 parts of Kraton G, a hydrogenated SBS triblock copolymer supplied by Shell Chemical Co.

The final composition was prepared in the same way, but the EPDM-modified polystyrene was replaced with 65 parts of Foster Grant 834 polybutadiene-modified polystyrene, and Kraton G was replaced with Kraton 1101, SBS block terpolymer supplied by Shell Chemical Co.

The plaques were plated under standard conditions, with a mixture of chromic acid and sulfuric acid as the etching solution and colloidal palladium as activator, and an electroless plate of copper, followed in succession by electroplated layers of nickel, copper, nickel and chromium.

The formulation and test results are set forth in the following table.

TABLE 1

| Example | PPO (parts) | Rubber-Modified Polystyrene (type) | (parts) | Triblock (type) | (parts) | Peel Strength (pounds/inch) Initial | Post-bake (30 min a 212° F.) |
|---|---|---|---|---|---|---|---|
| C-1* | 25 | 10% EPDM | 75 | — | — | 0.2 | 0.8 |
| C-2* | 25 | 15% EPDM | 75 | — | — | 0.4 | 1.2 |
| I | 25 | 10% EPDM | 65 | Kraton G | 10 | 3.7 | 5.7 |
| C-3* | 25 | FG 834 | 65 | Kraton 1101 | 10 | 5.5 | 6.3 |

*Comparative example.

It can be seen from the above that plated, molded articles comprised of PPO, a small-particle EPDM-modified alkenyl aromatic resin, and a hydrogenated block copolymer show a dramatic increase in peel strength as compared to similar compositions not having the hydrogenated elastomeric block copolymer. These articles have excellent surface appearance and peel strength almost as good as that of a composition comprised of an unsaturated rubber and an unsaturated triblock polymer.

Obviously, other modifications and variations of the present invention are possible in the light of the above teachings. It is, therefore, to be understood that changes may be made in the particular embodiments described above which are within the full intended scope of the invention as defined in the appended claims.

We claim:

1. A substrate adapted for the electroless deposition of an adherent metal coating, comprised of a molded thermoplastic composition comprising:
   (a) a polyphenylene ether resin;
   (b) an alkenyl aromatic resin that is modified with a rubbery interpolymer of a mixture of mono-olefins and a polyene by polymerizing alkenyl aromatic monomer in the presence of the rubbery interpolymer until 90–100% by weight of the alkenyl aromatic monomer has reacted, the rubbery interpolymer being comprised of particles having a median diameter less than about two microns; and
   (c) a selectively hydrogenated elastomeric block copolymer of the A-B-A type, wherein terminal blocks A are a polymerized vinyl aromatic hydrocarbon and center block B is a polymerized conjugated diene, the surface of said substrate having been rendered microporous by treatment with an etching solution.

2. The substrate of claim 1 wherein the polyphenylene ether resin is selected from the compounds of the formula

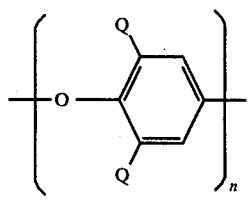

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals, and the halohydrocarbonoxy radicals having at least two carbon atoms between the halogen atom and the phenyl nucleus.

3. The substrate of claim 1 wherein the alkenyl aromatic resin is prepared from a monomer selected from the group consisting of styrene, α-methylstyrene, bromostyrene, chlorostyrene, divinylbenzene, and vinyltoluene.

4. The substrate of claim 1 wherein the alkenyl aromatic resin is modified with a rubbery interpolymer of ethylene, an alpha-olefin, and a polyene.

5. The substrate of claim 4 wherein the alpha-olefin is propylene.

6. The substrate of claim 1 wherein the rubbery interpolymer comprises 10–90 mole percent of ethylene, 10–90 mole percent of an alpha-olefin having 3–16 carbon atoms, and 0.1–12 mole percent of a polyene that is a non-conjugated cyclic or open-chain diene having 5–20 carbon atoms.

7. The substrate of claim 1 wherein the rubbery interpolymer comprises 10–90 mole percent of ethylene, 10–90 mole percent of propylene, and 0.1–12 mole percent of a polyene selected from 5-ethylidene-2-norbornene, 1,4-hexadiene, and dicyclopentadiene.

8. The substrate of claim 1 wherein the alkenyl aromatic resin is styrene and said rubbery interpolymer is present between about 4% and about 25% by weight of styrene and rubbery interpolymer combined.

9. The substrate of claim 1 wherein in the A-B-A block copolymer (c), the vinyl aromatic hydrocarbon of terminal blocks A is selected from the group consisting of styrene, α-methyl styrene, vinyltoluene, vinyl xylene, and vinyl naphthalene and the conjugated diene of center block B is selected from the group consisting of butadiene, 2-methyl-1,3-butadiene, 1,-3-pentadiene, and 2,3-dimethylbutadiene.

10. The substrate of claim 1 wherein in the A-B-A block copolymer (c), each of terminal blocks A has an average molecular weight of from about 4,000 to about 115,000 and center block B has an average molecular weight of from about 20,000 to 450,000.

11. The substrate of claim 1 wherein the average unsaturation of center block B has been reduced to less than 20% of its original value.

12. The substrate of claim 1 wherein the composition includes a reinforcing amount of an inorganic reinforcing filler.

13. The substrate of claim 12 wherein the composition includes from about 10 to 50% by weight of fibrous filaments based on the total weight of the composition.

14. The substrate of claim 1 wherein the composition includes a flame-retardant amount of a flame-retardant additive.

15. The substrate of claim 14 wherein the flame retardant is a halogenated organic compound, a halogenated organic compound in admixture with an antimony compound, elemental phosphorus, a phosphorus compound, compounds containing phosphorus-nitrogen bonds, or a mixture of two or more of the foregoing.

16. A substrate adapted for the electroless deposition of an adherent metal coating, comprised of a molded thermoplastic composition comprising:
  (a) from about 10 to about 65% by weight of a polyphenylene ether resin;
  (b) from about 20 to about 80% by weight of an alkenyl aromatic resin that is modified with a rubbery interpolymer which comprises 10–90 mole percent of ethylene, 10–90 mole percent of an alpha-olefin having 3–10 carbon atoms, and 0.1–12 mole percent of a polyene that is a non-conjugated cyclic or open-chain diene having 5–10 carbon atoms, by polymerizing alkenyl aromatic monomer in the presence of the rubbery interpolymer until 90–100% by weight of the alkenyl aromatic monomer has reacted, the rubbery interpolymer being comprised of particles having a median diameter less than about two microns; and
  (c) from about 1 to about 25% by weight of a selectively hydrogenated elastomeric block copolymer of the A-B-A type, wherein terminal blocks A are polymerized vinyl aromatic hydrocarbons and center block B is a polymerized conjugated diene,
the surface of said substrate having been rendered microporous by treatment with an etching solution.

17. The substrate of claim 16 wherein the polyphenylene ether resin is poly(2,6-dimethyl-1,4-phenylene) ether.

18. The substrate of claim 16 wherein the alpha-olefin is propylene.

19. A substrate adapted for the electroless deposition of an adherent metal coating, comprised of a molded thermoplastic composition comprising:
  (a) from about 10 to about 65% by weight of a polyphenylene ether resin;
  (b) from about 20 to about 80% by weight of an alkenyl aromatic resin that is modified with a rubbery interpolymer which comprises 10–90 mole percent of ethylene, 10–90 mole percent of an alpha-olefin having 3–10 carbon atoms, and 0.1–12 mole percent of a polyene that is a non-conjugated cyclic or open-chain diene having 5–10 carbon atoms, by polymerizing alkenyl aromatic monomer in the presence of the rubbery interpolymer until 90–100% by weight of the alkenyl aromatic monomer has reacted, the rubbery interpolymer being comprised of particles having a median diameter less than about two microns;
  (c) from about 1 to about 25% by weight of a selectively hydrogenated elastomeric block copolymer of the A-B-A type, wherein terminal blocks A are polymerized vinyl aromatic hydrocarbons and center block B is a polymerized conjugated diene; and
  (d) a reinforcing amount of an inorganic reinforcing filler,
the surface of said substrate having been rendered microporous by treatment with an etching solution.

20. The substrate of claim 19 wherein the polyphenylene ether resin is poly(2,6dimethyl-1,4-phenylene) ether.

21. The substrate of claim 19 wherein the alpha-olefin is propylene.

22. The substrate of claim 19 wherein the reinforcing filler comprises from about 10 to 50% of fibrous glass filaments, based on the total weight of the composition.

23. A substrate adapted for the electroless deposition of an adherent metal coating, comprised of a molded thermoplastic composition comprising:

(a) from about 10 to about 65% by weight of a polyphenylene ether resin;
(b) from about 20 to about 80% by weight of an alkenyl aromatic resin that is modified with a rubbery interpolymer which comprises 10-90 mole percent of ethylene, 10-90 mole percent of an alpha-olefin having 3-10 carbon stoms, and 0.1-12 mole percent of a polyene that is a nonconjugated cyclic or open-chain diene having 5-10 carbon atoms, by polymerizing alkenyl aromatic monomer in the presence of the rubbery interpolymer until 90-100% by weight of the alkenyl aromatic monomer has reacted, the rubbery interpolymer being comprised of particles having a median diameter less than about two microns;
(c) from about 1 to about 25% by weight of a selectively hydrogenated elastomeric block copolymer of the A-B-A type, wherein terminal blocks A are polymerized vinyl aromatic hydrocarbons and center block B is a polymerized conjugated diene; and
(d) a flame-retardant amount of a flame-retardant additive, the surface of said substrate having been rendered microporous by treatment with an etching solution.

24. The substrate of claim 23 wherein the alpha-olefin is propylene.

25. The substrate of claim 23 wherein the flame-retardant additive is a halogenated organic compound, a halogenated organic compound in admixture with an antimony compound, elemental phosphorus, a phosphorus compound, compounds containing phosphorus-nitrogen bonds, or a mixture of two or more of the foregoing.

26. The substrate of claim 23 wherein the flame-retardant additive comprises a mixture of an organic bromine-containing compound with antimony oxide.

27. The substrate of claim 23 wherein the flame-retardant additive is triphenylphosphate.

28. The substrate of claim 23 wherein the flame-retardant additive is comprised of a mixture of triaryl phosphates wherein one or more aryl groups are substituted by one or more isopropyl groups.

* * * * *

UNITED STATES PATENT AND TRADEMARK OFFICE
CERTIFICATE OF CORRECTION

PATENT NO. : 4,172,929
DATED : October 30, 1979
INVENTOR(S) : G. D. Cooper, W. R. Haaf and A. Katchman It is certified that error appears in the above-identified patent and that said Letters Patent are hereby corrected as shown below:

Abstract, line 4, "polymer" should read --copolymer--.
Column 1, line 28, "reins" should read --resins--;
Column 4, line 66, "monochloropolysyrene" should read --monochloropolystyrene--;
Column 5, line 67, "derivatives" should read --derivative--;
Column 8, line 66, "and" second occurrence should read --are--;
Column 11, line 49, "3 1/4" " should read -- 3 3/4" --.

Signed and Sealed this

Twenty-second Day of April 1980

[SEAL]

Attest:

SIDNEY A. DIAMOND

Attesting Officer

Commissioner of Patents and Trademarks